United States Patent [19]

Plichta et al.

[11] Patent Number: 5,035,963
[45] Date of Patent: Jul. 30, 1991

[54] HIGH TEMPERATURE RECHARGEABLE MOLTEN SALT BATTERY

[75] Inventors: Edward J. Plichta, Howell; Wishvander Behl, Ocean, both of N.J.

[73] Assignee: The United States of America as represented by the Secretary of the Army, Washington, D.C.

[21] Appl. No.: 580,689

[22] Filed: Sep. 11, 1990

[51] Int. Cl.[5] ............ H01M 4/58; H01M 4/62
[52] U.S. Cl. .................... 429/103; 429/221; 429/223; 429/218
[58] Field of Search ........... 429/103, 199, 221, 223, 429/218

[56] References Cited

U.S. PATENT DOCUMENTS

| 4,143,213 | 3/1979 | Jacobson et al. | 429/221 X |
|---|---|---|---|
| 4,304,825 | 12/1981 | Basu | 429/199 X |
| 4,383,014 | 5/1983 | Armijo et al. | 429/221 X |
| 4,728,590 | 3/1988 | Redey | 429/221 |
| 4,764,437 | 8/1988 | Kaun | 429/199 X |

Primary Examiner—Stephen J. Kalafut
Attorney, Agent, or Firm—Michael Zelenka; Roy E. Gordon

[57] ABSTRACT

An improved high temperature rechargeable molten salt battery is obtained by the use of alkaline earth metal sulfides as cathode additives in transition metal sulfide cathodes in these batteries.

5 Claims, 2 Drawing Sheets

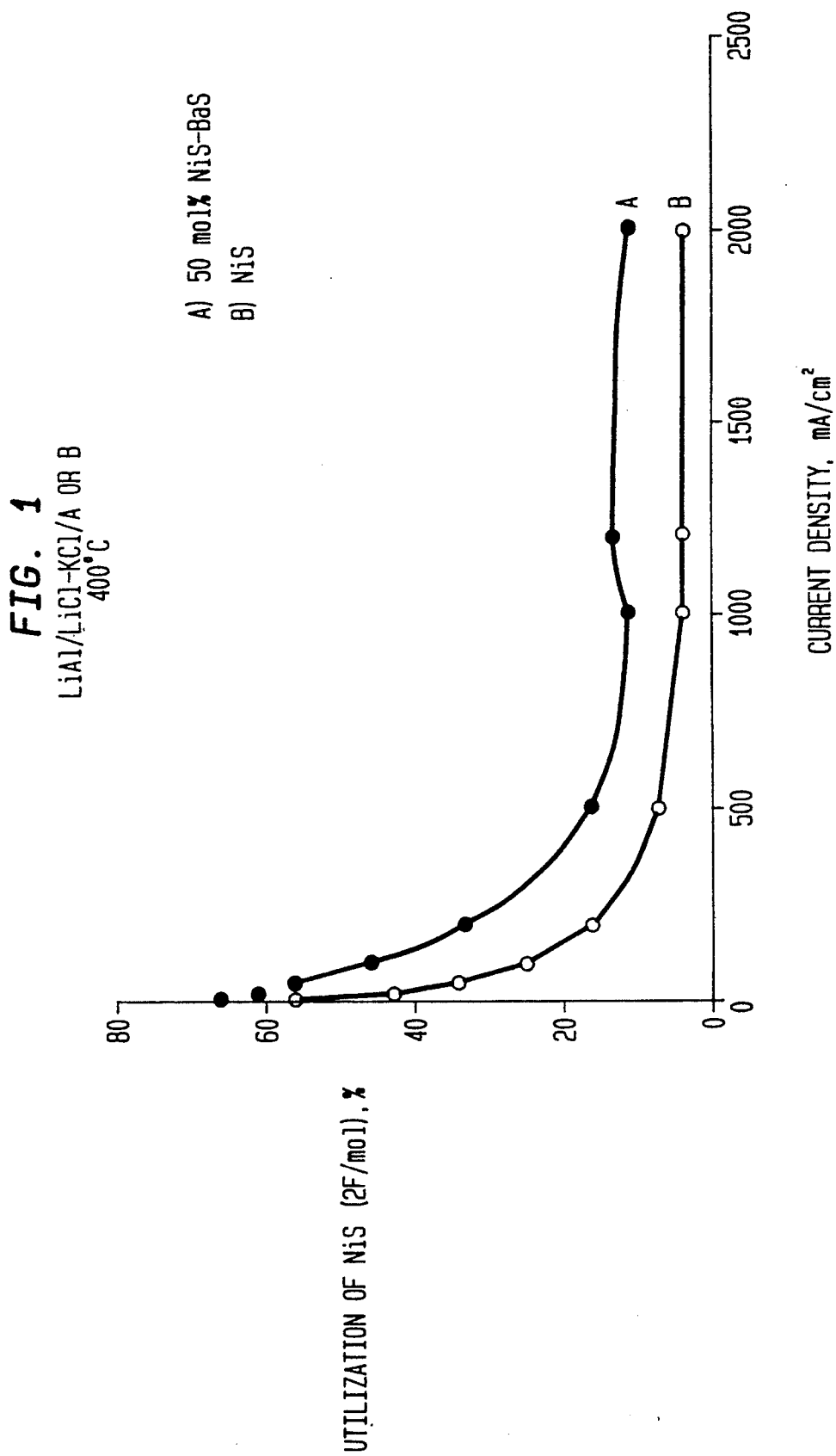

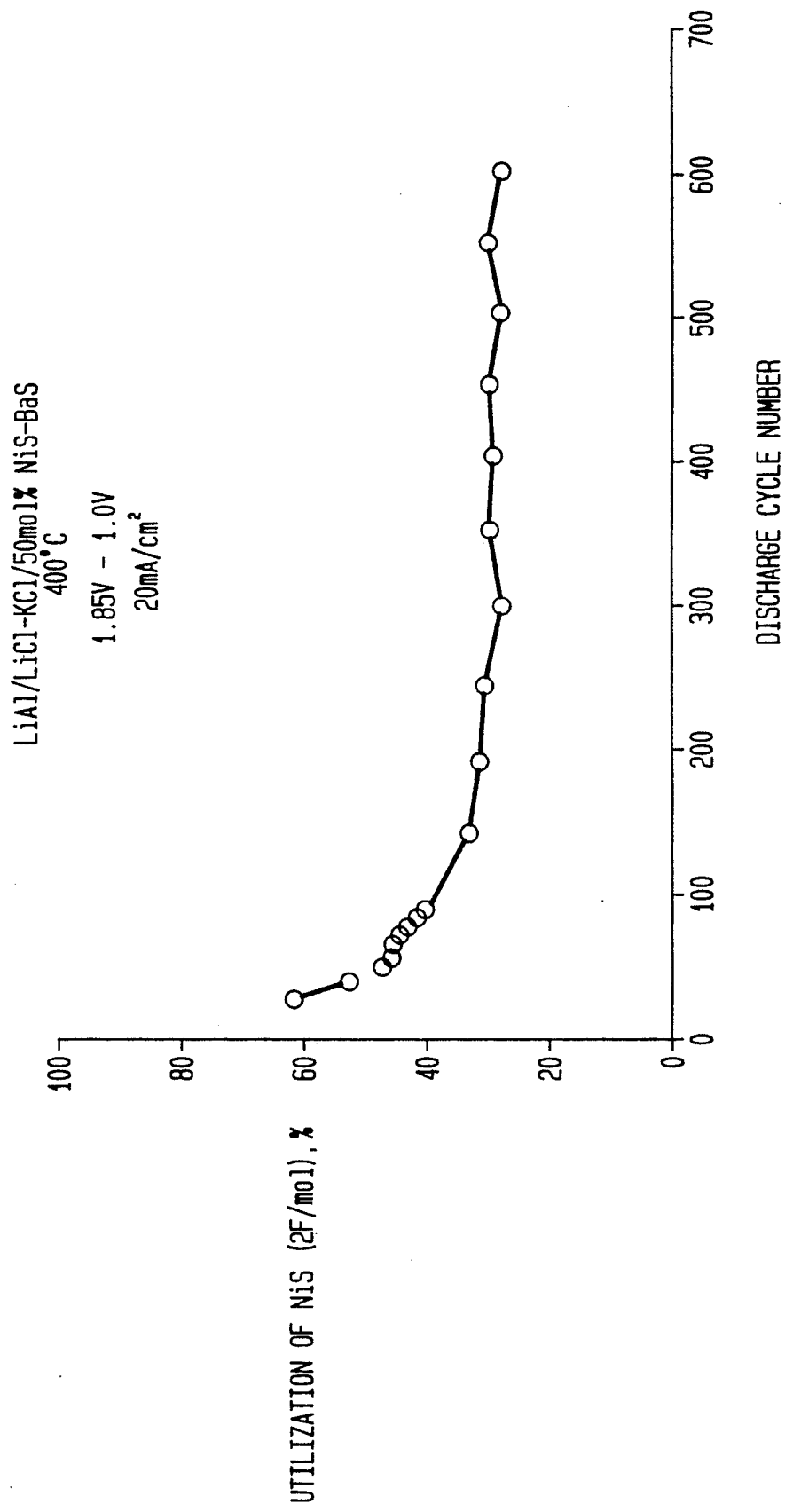

HIGH TEMPERATURE RECHARGEABLE MOLTEN SALT BATTERY

GOVERNMENT INTEREST

The invention described herein may be manufactured, used, and licensed by or for the Government for governmental purposes without the payment to us of any royalty thereon.

FIELD OF INVENTION

This invention relates in general to an improved high temperature rechargeable molten salt battery, and in particular to such a battery using alkaline earth metal sulfides as cathode additives in transition metal sulfide cathodes in these batteries

BACKGROUND OF THE INVENTION

High temperature rechargeable molten salt batteries have been known that use transition metal sulfide cathodes, a LiAl alloy anode, and a molten lithium-salt electrolyte. Although these batteries have enjoyed some use as pulse power type batteries, it would be desirable to develop higher energy pulse power type batteries as well as improving the specific energy and power of these batteries for electric vehicles, load leveling, military, and space applications.

SUMMARY OF THE INVENTION

The general object of this invention is to provide an improved high temperature rechargeable molten salt battery. A more particular object of the invention is to provide such a battery that will have improved specific energy and power for use in electric vehicles, load leveling, military and space applications.

It has now been found that the use of alkaline earth metal sulfides as a cathode additive in molten salt batteries will enable the development of higher energy pulse power type batteries as well as improving the specific energy and power of batteries for electric vehicles, load leveling, military, and space applications. Use of these additives in the transition metal sulfide cathodes in electrochemical cells containing a LiAl alloy anode and a molten lithium-salt electrolyte significantly improve the cathode utilization and cycling performance of the transition metal sulfide cathodes over those cathodes that do not contain the additive. Specifically, the use of BaS, SrS, CaS, MgS, BeS, or RaS as an electrode additive to cathodes containing FeS, CoS, or NiS as the electrochemically active component where the cathode composition comprises 1 to 99 weight percent alkaline earth metal sulfide component. The electrochemical cell described herein uses a lithium aluminum alloy of 48 atomic percent lithium as the anode, a eutectic mixture of lithium chloride and potassium chloride of 59 mole percent lithium chloride and 41 mole percent potassium chloride with a melting point of 352° C. as the electrolyte, and a cathode of 50 mole percent NiS and 50 mole percent BaS additive. The cathode mix is prepared by physically mixing NiS and BaS in the proper rations. The electrochemical cell is a three pellet stack of anode, separator, and cathode. An anode pellet of 0.10 gram (LiAl) is pressed in a ½ inch diameter die to 1000 pounds, and a cathode pellet of 0.10 gram (85 weight percent (50/50 mole percent NiS-BaS) and 15 weight percent LiCl-KCl is pressed in a ½ inch diameter die to 1000 pounds. The pellets are stacked in a ½ inch diameter boron nitride bushing to guard against edge shorting. The stacked pellet cell is held in compression through the use of a high temperature stainless steel spring assembly with a molybdenum disk at the anode side and a graphite disk at the cathode side to act as current collectors. The spring loaded cell assembly is sealed in a pyrex vessel that enables the cell to be operated over an anhydrous flowing argon atmosphere. Feed-through connections through the top of the pyrex vessel provide electrical connection to the positive and negative terminals of the cell.

DESCRIPTION OF THE DRAWING

FIG. 1 demonstrates the improved cathode utilization of the NiS cathode containing 50 mole percent BaS over that of a NiS cathode with no additive when operated at 400° C. for various discharge rates up to 2A/cm$^2$.

FIG. 2 shows the excellent cycling performance observed for the NiS cathode containing 50 mole percent BaS when cycled between 1.85 and 1.0 V at 20mA/cm$^2$ at 400° C.

Referring to FIG. 1; based on the following overall electrochemical cell reaction:

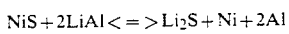

$$NiS + 2LiAl <=> Li_2S + Ni + 2Al$$

The observed cathode utilization at discharge rates of 10, 100, and 500 mA/cm$^2$ for the cathode containing 50 mole percent BaS is 66, 46 and 16 percent, respectively. This corresponds to an improvement in the electrochemical utilization of NiS by 9 to 22 percent over those NiS cathodes not containing any alkaline earth metal sulfides.

Referring to FIG. 2, the additions of alkaline earth metal sulfides to the transition metal sulfide cathodes are probably beneficial in reducing the solubility of the electrochemical reduction products (i.e., Li$_2$S) from the cathode, that is known to result in poor cycling performance in high temperature metal sulfide batteries. Thus, the addition of the alkaline earth metal sulfides to transition metal sulfide cathodes reduces the loss of the cell reaction products formed in the cathode and therefore result in improved electrochemical performance.

The high temperature molten salt electrochemical cell of the invention can be comprised of a cathode containing 1 to 99 weight percent transition metal sulfide, 0 to 22 weight percent lithium halide-alkali halide electrolyte, and 1 to 99 weight percent alkaline earth metal sulfide additive, with a separator containing 65 weight percent lithium halide-alkaline halide electrolyte and 35 weight percent MgO, and an anode containing LiAl alloy of 48 mole percent lithium.

According to the invention, the transition metal sulfides are of the type FeS, CoS, and NiS including mixtures thereof.

According to the invention, the separation between the anode and the cathode may be provided by a mixture of 65 weight percent molten salt electrolyte including any alkali chloride, fluoride, bromide, iodide or mixtures thereof with 35 weight 5 percent separator material such as MgO, BN, Y$_2$O$_3$, ZrO$_2$, including other such electrically insulative materials, or Beta-alumina, or other such ionically conductive separator materials.

The electrolyte may contain any molten salt, and or eutectic mixture of metal halides, carbonates, nitrates or oxalates.

The anode may be Li, LiAl, LiSi, Na, K, Ca, Mg or any alkali metal or group IIA element, or alloy, or composite mixture of such electronegative materials.

We wish it to be understood that we do not desire to be limited to the exact details of construction shown and described for obvious modifications will occur to a person skilled in the art.

What is claimed is:

1. A high temperature rechargeable molten salt battery including a transition metal-sulfide as the cathode, a lithium-aluminum alloy as the anode, a molten lithium salt as the electrolyte, and an alkaline earth metal sulfide as an additive to the transition metal sulfide cathode wherein the cathode mix is prepared by physically mixing the alkaline earth metal sulfide and the transition metal sulfide in the proper ratios.

2. A high temperature rechargeable molten salt battery according to claim 1 wherein the transition metal sulfide is at least one transition metal sulfide selected from the group consisting of FeS, CoS and NiS and wherein the alkaline earth metal sulfide is at least one alkaline earth metal sulfide selected from the group consisting of BaS, SrS, CaS, MgS, BeS, and RaS.

3. A high temperature molten salt battery according to claim 2 wherein the molten lithium salt is a eutectic mixture of lithium chloride (59 mole percent) and potassium chloride (41 mole percent) with a melting point of 352° C.

4. A high temperature rechargeable molten salt battery according to claim 1 wherein the cathode composition includes about 1 to 99 weight percent alkaline earth metal sulfide component.

5. A high temperature rechargeable molten salt battery comprising a lithium aluminum alloy of 48 atomic percent lithium as the anode, a eutectic mixture of lithium chloride and potassium chloride of 59 mole percent lithium chloride and of 41 mole percent potassium chloride with a melting point of 352° C. as the electrolyte, and a cathode of 50 mole percent NiS and 50 percent BaS additive wherein the cathode mix is prepared by physically mixing NiS and BaS in the proper ratios.

* * * * *